June 3, 1969   W. M. SHARP   3,447,789
PORTABLE PERLITE HANDLING APPARATUS AND METHOD
Filed May 31, 1967   Sheet 1 of 2
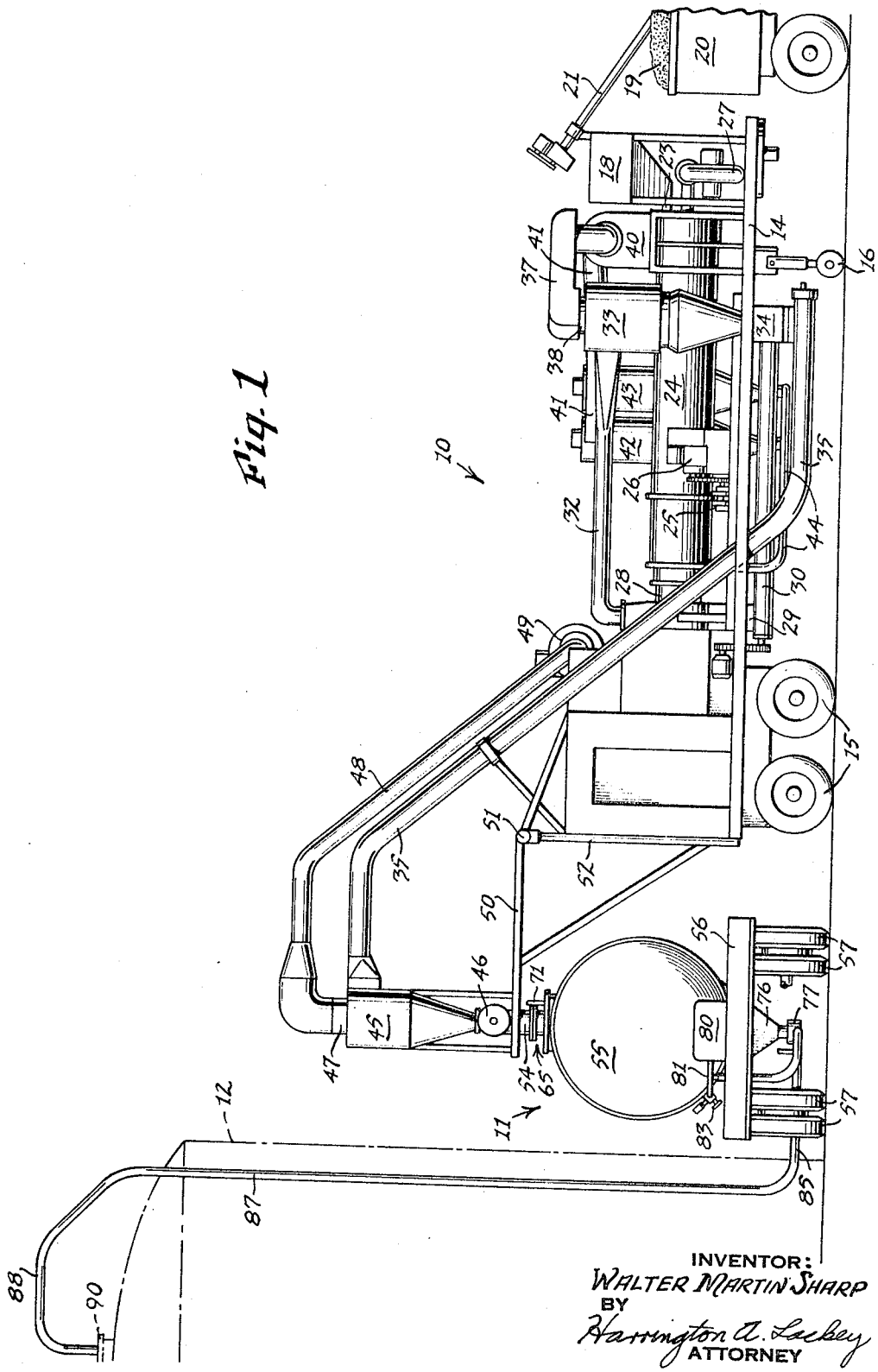
INVENTOR:
WALTER MARTIN SHARP
BY
Harrington A. Lackey
ATTORNEY

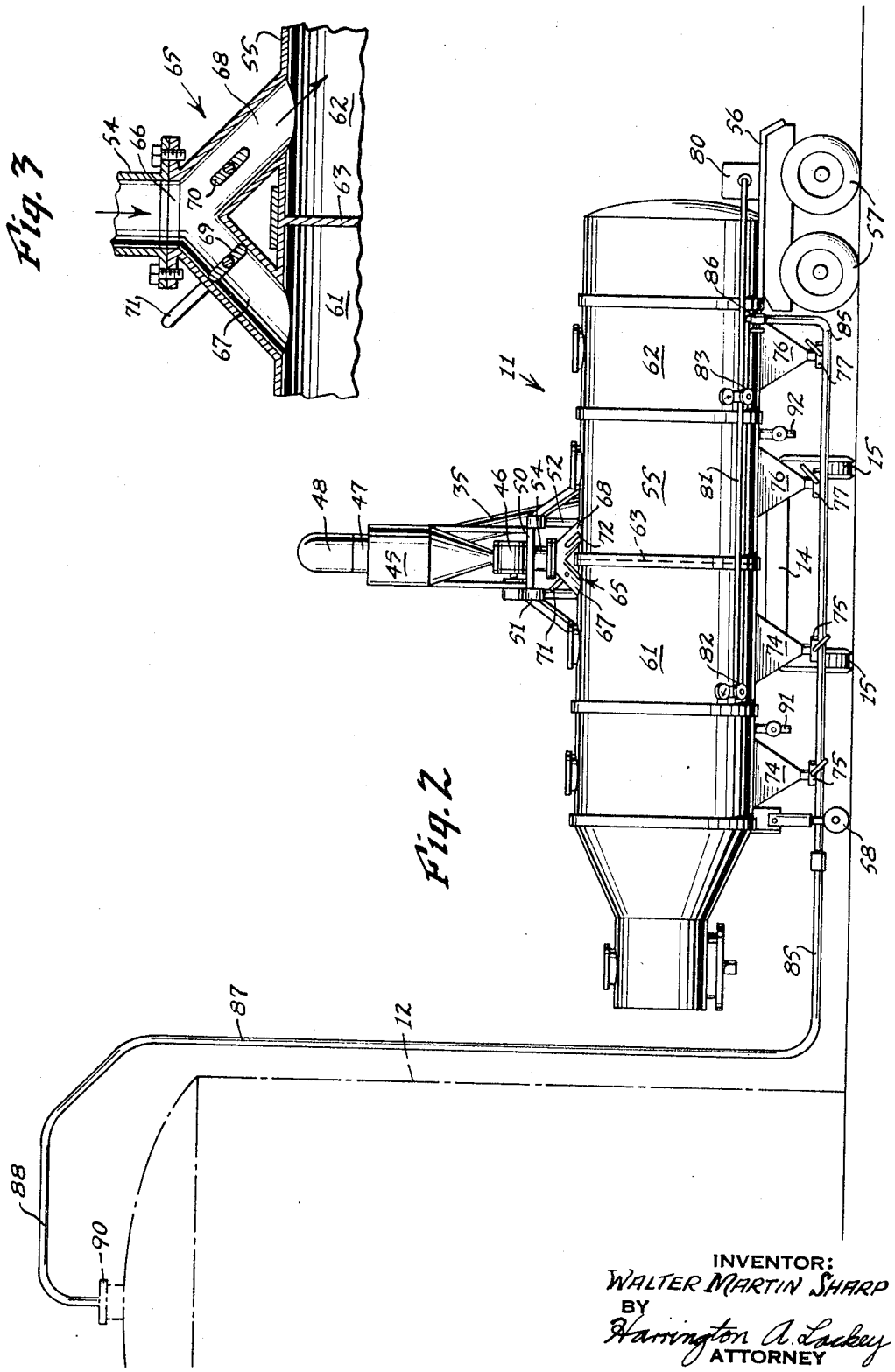

United States Patent Office 3,447,789
Patented June 3, 1969

3,447,789
PORTABLE PERLITE HANDLING APPARATUS
AND METHOD
Walter Martin Sharp, Nashville, Tenn., assignor to Chemrock Corporation, Nashville, Tenn., a corporation of Tennessee
Filed May 31, 1967, Ser. No. 642,366
Int. Cl. F27b 7/10
U.S. Cl. 263—22                                    5 Claims

ABSTRACT OF THE DISCLOSURE

A portable perlite handling apparatus having a pressurized chamber for receiving expanded perlite from a device in situ, and a conduit system for delivering the pressurized expanded perlite from the pressurized chamber to a delivery station above the chamber.

BACKGROUND OF THE INVENTION

This invention relates to a portable apparatus for handling expanded perlite in situ.

Perlite expanded from its mineral ore has been found to be a very desirable insulating material for cryogenic storage vessels, such as tanks for storing liquid oxygen.

Although the technology of expanding perlite from its mineral ore is well developed, such technology conventionally involves the thermal expansion, treatment and processing of the perlite particles from its mineral ore at a fixed plant, and then shipping the expanded perlite to its destination for use or installation. Such technology has been satisfactory and adequate for certain uses of expanded perlite, such as in agriculture where expanded perlite is employed for mixing with the soil to lighten it or as a mulch, and in the construction industry where expanded perlite is incorporated as a lightweight aggregate in concrete. In these two industries, the expanded perlite may be shipped to its destination and stored and used as needed. Moreover, the nature of these industries is such that the uses of the expanded perlite may be repeated.

On the other hand, in the insulation of cryogenic storage vessels, such vessels usually require huge amounts of material at one time, but only one time. Once the vessel is properly insulated, the requirement of any additional expanded perlite for that vessel at that site again is rare.

Considering the above factors, as well as the very important factor that expanded perlite occupies a volume approximately ten to twenty times greater than its original unexpanded mineral ore, the problems of making the expanded perlite in one location and transporting the perlite in its expanded condition to a site which requires large volumes of the material at one time with little if any prospect for any additional material at a future time, is apparent.

Consequently, it has been discovered that for such jobs as the insulation of cryogenic storage vessels, it is more economical to set up a temporary expansion plant at the site of installing the perlite insulation material in the storage vessel, and expand and deliver the perlite to the storage vessel in situ. One example of such a field expansion apparatus is disclosed in U.S. Patent No. 3,206,905, issued to G. A. Wavering et al. on Sept. 21, 1965, and in British Patent No. 969,430 of Chicago Bridge and Iron Company, dated Jan. 18, 1963. The field expansion apparatus disclosed in these two patents are quite similar and include a thermal expander device for expanding the perlite and a pair of cyclone separators, one separator being located adjacent the expander device, and the other cyclone being located on top of the cryogenic storage vessel. The expanded perlite is conveyed from the furnace to the first cyclone where the hot gases are separated from the perlite, and the perlite is then conveyed from the first cyclone to the second cyclone on top of the storage vessel, and simultaneously cooled, by means of a conventional blower.

There are two primary objections to the field expansion system disclosed in the above Wavering and Chicago Bridge and Iron patents. First of all, a cyclone apparatus and delivery blower must be hoisted and installed on top of the cryogenic storage vessel. Secondly, and most important, is that the efficiency of the conveyancing apparatus for elevating the expanded perlite from the expander apparatus and collection system to the top of the storage vessel is quite limited. Not only is there an unnecessary quantity of air required to carry or float the expanded perlite upwardly to the top of the vessel, but much of this air must be eliminated on top of the vessel before the perlite can be delivered into the insulation space within the vessel. Moreover, because of the low concentration of expanded perlite particles in the pneumatic conveying medium, more perlite particles are exposed to impact with the walls of the conveying conduit, particularly in the turns and bends of the conduit. Expanded perlite is very friable, and a large percentage of the particles are fractured and crushed by the time they reach the top of the storage vessel. Consequently, the insulating characteristics of the expanded perlite are impaired.

SUMMARY OF THE INVENTION

It is therefore an object of this invention to provide a portable perlite handling apparatus which is compact and mobile for the processing of expanded perlite in situ, and which also includes an improved expanded perlite delivery apparatus.

Another object of this invention is to provide a portable perlite handling apparatus which is adapted to receive expanded perlite particles which have been manufactured and concentrated in situ, and convey such concentrated particles to a substantially elevated station, such as the top of a cryogenic storage vessel, without the necessity of any separating apparatus on top of the vessel.

A further object of this invention is to provide a portable perlite handling apparatus capable of delivering a large volume of expanded perlite from a field expansion site over a long distance to an elevated station, in a minimum of time and with a minimum of particle breakage.

Another object of this invention is to provide a portable perlite handling apparatus for delivering a charge of expanded perlite particles to an elevated station with a minimum volume of fluid conveying medium, such as air.

A further object of this invention is to provide a portable perlit handling apparatus having pressurized means for positively forcing the concentrated mass of expanded perlite particles to an elevated station.

BRIEF DESCRIPTION OF THE DRAWINGS

FIG. 1 is an elevational view of the invention in operative position for delivering expanded perlite to a cyrogenic storage vessel, the expander unit being shown in side elevation and the delivery apparatus being shown in end elevation;

FIG. 2 is a view taken at right angles to FIG. 1, disclosing the delivery apparatus in side elevation; and FIG. 3 is an enlarged fragmentary sectional elevation of the tank inlet.

DESCRIPTION OF THE PREFERRED EMBODIMENT

Referring now to the drawings in more detail, FIG. 1 discloses a mobile expander unit or apparatus 10 and a mobile delivery unit or apparatus 11 assembled in operative position, in situ, for expanding and processing perlite from its mineral ore, and delivering the expanded perlite to the top of a cryogenic storage vessel 12 for the purpose of insulating the vessel.

The expander unit 10 includes a mobile platform 14 supported on ground engaging wheels 15 and dolly 16 to adapt the expander unit 10 for movement to various operational sites, when attached to a prime mover, not shown.

Mounted on the expander unit platform 14 is a hopper 18 for receiving mineral perlite ore 19 from any convenient source, such as truck 20, by means of screw conveyor 21. The perlite ore is fed from the hopper 18 through feed screw conveyor 23 to the expander device or perlite furnace 24. As disclosed in FIG. 1, the furnace 24 is rotatably mounted on rollers 25 which are driven by a suitable drive motor 26. The furnace 24 is fed with fuel and air by a fuel feed and blower mechanism 27.

As the perlite ore is fed into the rotary furnace 24, the ore is expanded into light perlit particles, many times greater than its original volume, in a conventional manner. The expanded perlite particles are discharged into the outlet head 28 of the furnace 24, where the heavier particles drop by gravity through conduit 29 into screw conveyor 30 which feeds these heavier particles toward the front of platform 14.

The lighter, expanded perlite particles, which do not gravitate to the screw conveyor 30, are conveyed upwardly through the pneumatic outlet conduit 32 into the inlet of the primary cyclone 33, where the intermediate weight perlite is separated from the air, gravitates through a rotary airlock, not shown, and receptacle 34, into the lower end of a conveyor conduit 35.

At this point, it should be noted that the screw conveyor 30 discharges the heavier particles from the outlet conduit 29 into the same receptacle 34, so that both the heavier and intermediate grades of the expanded perlite are discharged into the conveyor conduit 35.

An outlet conduit 37 is connected to the air outlet 38 of the cycle 33 and the inlet of a suction fan 40. It is this suction fan 40 that has sufficient capacity to convey the expanded perlite and hot gases from the furnace to the cyclone 33, as well as to separate the air from the intermediate grade perlite in the cyclone 33.

The discharge conduit 41 from the fan 40 is connected to inlets of a pair of secondary cyclones 42 and 43 for further separation of the finer particles of expanded perlite, which gravitate downwardly and are discharged through conduit 44 into the conveyor conduit 35. The secondary cyclones 42 and 43 further classify the expanded perlite particles in order to eliminate an excessive discharge of perlite dust to the surrounding area, as well as to reclaim such fine expanded particles for use as part of the insulating material.

By providing for these three separate classifications of the perlite particles, effective controls may be maintained, such as for varying the furnace temperature or blower speeds, in order to regulate the proportion of the various grades of perlite included in the final insulating material.

The fluid conveyor conduit 35 extends upwardly, as disclosed in FIG. 1, and beyond the rear end of the expander platform 14 to connect to the inlet of a delivery cyclone 45. This cyclone 45 further separates air and gases from the expanded perlite particles, which gravitate into the rotary airlock 46. The air and gases are drawn from the cyclone air outlet 47 through a suction pipe 48 by a suction fan 49. The suction fan 49 has a sufficient capacity, not only to separate the air and expanded perlite particles in the cyclone 45, but also to draw the expanded perlite particles through the entire length of the conveyor conduit 35.

The delivery cyclone 45 is mounted upon a platform 50 which is pivotally mounted on hinges 51 on the end frame 52 supported above the platform 14. The height of the end frame 52 is such that the platform 50 will extend substantially horizontally beyond the end of the expander platform 14 and above the delivery apparatus 11. Projecting downwardly through the platform 50 from the airlock 46 is a delivery spout 54.

After the expansion and delivery of the perlite is completed, and it is desired to move the expander unit 10 to another location, the conveying conduit 35, preferably made in sections, is uncoupled or dis-assembled, and the suction pipe 48, also made in sections, is also dis-assembled, and the platform 50 is swung upwardly and inwardly about the hinges 51 so that the cyclone 45 is in an upside-down position, but is supported above and within the lateral limits of the expander platform 14.

The delivery apparatus 11 is also mobile and comprises an elongated cylindrical tank 55 which is supported at one end by the platform 56 mounted on ground engaging wheels 57, and at the other end by dolly 58.

As best disclosed in FIGS. 2 and 3, the tank 55 is divided into a forward compartment 61 and a rear compartment 62 by a common wall or bulkhead 63. Each compartment 61 and 62 is adapted, not only to receive expanded perlite particles, but also to sustain sufficient internal pressure to accomplish the purposes of the invention. Mounted on top of the tank 55 is an inlet member 65 having an inlet opening 66 adapted to be connected to the delivery spout 54 of the cyclone 45, and comprising a pair of branch inlet pipes 67 and 68 diverging from the common inlet 66 and communicating respectively with the forward compartment 61 and the rear compartment 62. Pivotally mounted in each branch pipe 67 and 68 is a rotary or butterfly valve 69 and 70, respectively, with the forward compartment 61 and the rear compartment each valve of which is operatively connected to a handle 71 and 72.

Fixed to the bottom of the tank 55 are one or more outlet spouts 74, each controlled by a discharge valve 75 for discharging perlite from the bottom of the forward compartment 61. In the same manner, outlet spouts 76, each controlled by its discharge valve 77, are fixed to the bottom of the tank 55 to discharge the contents of the rear compartment 62.

Mounted on the platform 56 at the rear of the tank 55 is an air compressor 80 to which is connected to a main air pressure or manifold line 81 extending forwardly along the tank 55. This manifold line 81 communicates with each of the forward and rear compartments 61 and 62 through the pressure inlet valves 82 and 83, respectively.

A perlite delivery conduit or line 85 is connected at one end to the manifold line 81 between the rear inlet valve 83 and the air compressor 80. The flow of pressurized air from the manifold line 81 into the delivery conduit 85 is controlled by a delivery control valve 86. The opposite end of the delivery conduit 85 forms a riser 87 extending high enough to project above the top of the storage tank 12, and terminating in a discharge section 88 which is adapted to fit into the inlet port 90 on top of the storage tank 12. Between the riser 87 and the delivery control valve 86, the discharge valves 75 and 77 are connected to the delivery conduit 85 in order to discharge the contents of their respective outlets 74 and 76 into the delivery conduit 85 when each respective valve 75 and 77 is open.

Also forming a part of the tank equipment are the forward blow-down valve 91 and the rear blow-down valve 92 in fluid communication with the forward compartment 61 and the rear compartment 62, respectively.

In the operation of the invention, as disclosed in the drawings, both the expander unit 10 and the delivery unit 11 are transported by prime movers to the installation site where a large quantity of expanded perlite is required, such as adjacent the large cryogenic storage vessel 12 for receiving material such as liquid oxygen, and having spaced walls adapted to be filled by the expanded perlite for insulation. The expander unit 10 and the delivery apparatus 11 are arranged substantially as shown in the drawings, with the delivery apparatus 11 adjacent the storage tank 12, and the expander unit 10 adjacent the delivery apparatus 11, with its longitudinal axis approximately perpendicular to the longitudinal axis of the delivery apparatus 11 to form a T-shaped layout. The prime movers are removed and the dollies 16 and 58 adjusted to support the respective expander unit 10 and delivery apparatus 11 in a temporary stationary position. The platform 50 is pivoted about its hinges 51 to its operative position as disclosed in FIGS. 1 and 2, and the delivery spout 54 is secured to the inlet member 65.

Since most of the piping and conduit are transported in sections, all the sections are connected to provide the fluid systems as shown in the drawings. The riser 87 is projected above the storage tank 12 and the discharge section 88 inserted into the inlet port 90.

In the initial operative position, one inlet branch valve 69 or 70 is opened, while the other inlet branch valve is closed. For example, as best disclosed in FIGS. 2 and 3, the inlet valve 69 to the forward compartment 61 is closed, while the rear inlet valve 70 is open. All of the discharge valves 75 and 77, the delivery control valve 86, and the pressure inlet valves 82 and 83 are closed.

The furnace or expander device 24 is started, and perlite ore 19 is fed into the furnace 24 from the truck source 20 by the screw conveyor 21, the hopper 18, and screw conveyor 32. As the perlite is expanded in the furnace 24, the expanded particles are discharged through the outlet head 28, where the heavier particles are fed through the conveyor 30 to the receptacle 34. The intermediate and lighter expanded particles rise and are drawn through the outlet conduit 32 into the cyclone 33. There, the intermediate particles gravitate into the receptacle 34, while the lighter particles are removed by the suction fan 40 through the outlet air conduit 37. The heavy and intermediate particles gravitate from the receptacle 34 into the conveyor conduit 35, and are subsequently joined by the lighter particles separated in the secondary cyclones 42 and 43. The mixture of all the classified expanded pariticles is then conveyed upwardly through the conveyor conduit 35 to the cyclone 45 by means of the suction fan 49, which further separates air from the perlite particles. The concentrated particles are then discharged from the cyclone 45 through the discharge spout 54 into the inlet member 65 and through the open branch pipe 68 into the rear compartment 62.

After the rear compartment 62 is filled with expanded perlite particles, the rear inlet valve 70 is closed, and the forward inlet valve 69 is opened to divert the flow of expanded perlite particles into the forward compartment 61. While the forward compartment 61 is being filled, the air compressor 80 is started and the air inlet valve 83 is opened to intoduce compressed air into the rear compartment 62. After the pressure in the rear compartment 62 has reached a predetermined value, such as 5 p.s.i. above atmospheric pressure, the inlet pressure valve 83 is closed. The delivery control valve 86 is then opened to permit compressed air to enter the delivery line 85, and all the rear discharge valves 77 are opened. The expanded perlite in the compressed rear chamber or compartment 62 is forced or extruded through the outlets 76 into the delivery conduit 85, then through the conduit 85, upwardly through the riser 87, and ultimately discharged into the inlet port 90.

The compressed air from the manifold line 81 which is forced through the conveyor conduit 85, also assists in conveying the pressurized expanded perlite to the inlet port 90. The compressed air in the conveyor conduit 85 not only forces the concentrated perlite which is already in the conduit 85, but also produces suction across the outlets of discharge valves 77, so that perlite is not only discharged from the rear compartment 62 by the compressed air in the compartment 62, but also by the Venturi effect of the compressed air rushing across the outlets of the valves 77.

The delivery conduit 85 has a smaller diameter than delivery conduits heretofore used. The prior delivery conduits, such as the delivery pipe disclosed in the Wavering patent, have been of a size sufficient to handle a large volume of air used as a conveying medium and propelled by a conventional suction fan or blower. Such a delivery conduit would have a diameter comparable to that of conveyor conduit 35.

It is to be particularly emphasized that no large-capacity suction or blower fans are employed in the conveyance of the expanded perlite products from the delivery apparatus 11 to the storage tank 12, but the conveyance is executed by positive pressure of a low capacity air compressor forcing a product having a higher ratio of expanded particles to air through a confined passage.

After the rear compartment 62 has been emptied of its contents, the discharge valves 77 are closed, and the rear blow-down valve 92 may be opened to de-pressurize the rear chamber 62.

After the forward compartment 61 has been filled, the rotation of the inlet valves 69 and 70 are reversed so that they again occupy their original respective positions as disclosed in FIG. 3, and the rear compartment 62 is again filled with expanded perlite particles.

The delivery control valve 86 is closed as long as no material is being conveyed through the delivery conduit 85.

After the forward compartment 61 is filled, the forward pressure valve 82 is opened to charge the forward compartment to the predetermined conveying pressure, approximately 5 p.s.i. above atmosphere. After the desired pressure is obtained, the pressure valve 82 is closed, and the discharge valves 75 are opened as well as the control valve 86 to repeat the same procedure for conveying expanded perlite particles from the forward compartment 61 as for the rear compartment 62.

In this manner, the expander unit 10 can be maintained in continuous operation for manufacturing the expanded perlite, while the perlite is alterately stored in one compartment and delivered from the other compartment in the tank 55.

An appreciation of the importance and effectiveness of the invention can be further realized by a comparison of the relative sizes and operational characteristics of some of the elements. In a typical expander unit 10, a suction fan 40 for handling the hot expanded products of the furnace 24 would have a capacity in the order of 4500 cu. ft. per minute (c.f.m.). At this stage in the operation, a large volume of air is handled in proportion to the quantity of expanded perlite particles. The second suction fan 49 has a capacity in the order of only 2300 c.f.m. since the expanded perlite which it draws through conveyor conduit 35 has been concentrated by the cyclones 33, 42 and 43, and thus a smaller amount of air in proportion to the quantity of perlite is handled by the second suction fan 49. Furthermore, the perlite which is separated by the cyclone 45 has been further concentrated by the removal of air and gases through the suction pipe 48.

Although air is introduced into the storage compartments 61 and 62, nevertheless a smaller quantity is required because it is under pressure and most of the expanded perlite is massed below the compressed air in the respective compartments 61 and 62. Therefore, when discharge valves 75 and 77 have been opened, the perlite is rammed or extruded through the valves 75 and 77 into the delivery conduit 85 by the force of the compressed air above the perlite in the tank 11. But at this stage only about 125 c.f.m. of compressed air is moved through the delivery conduit 80 by air compressor 80.

Furthermore, the pneumatic conveyor pipes and conduits on the expander unit 10, such as the conveyor conduit 35, have a diameter in the order of 10 inches, while the delivery conduit 85 only requires a diameter in the order of 4 inches. Nevertheless, in spite of the relatively smaller delivery conduit 85 and smaller air capacity, as much expanded perlite is moved from tank 55 to storage vessel 12 in 12 minutes as is moved through conveyor conduit 35 in one hour.

The expanded perlite moving through the delivery conduit 85 carries much less air and presents a concentrated mass to the pressure behind it so that there is a more efficient delivery of expanded perlite into the storage tank 12. Because of the concentration of the particles, there is a smaller percentage of particles which contact the walls of the delivery conduit. Since expanded perlite particles are very friable, the more perlite particles that come in contact with the walls of the delivery conduit, the more apt they are to become fractured or crushed.

It is therefore apparent that this invention provides an apparatus for not only expanding and delivering the expanded perlite in situ, but an apparatus which delivers more perlite faster and with less damage to the perlite than other similar apparatus heretofore employed in the field expansion of perlite.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. A portable perlite handling apparatus comprising:
   (a) mobile platform means,
   (b) an expander device on said platform means for converting perlite mineral ore into expanded perlite particles, and having an expander inlet for receiving said ore and an expander outlet for said expanded perlite particles,
   (c) a primary cyclone having an inlet, a material outlet, and a gas outlet,
   (d) a first expander outlet conduit connecting said expander outlet with said cyclone inlet,
   (e) a first suction fan connected to said primary cyclone gas outlet,
   (f) a tank for receiving expanded perlite particles under pressure mounted on said platform means, and having an inlet and an outlet,
   (g) an inlet valve for opening and closing said tank inlet,
   (h) an outlet valve for opening and closing said tank outlet,
   (i) a delivery cyclone having an inlet, a material outlet and a gas outlet, said delivery cyclone material outlet being mounted proximate to and in fluid communication with said tank inlet,
   (j) a conveyor conduit connecting the material outlet of said primary cyclone with the inlet of said delivery cyclone;
   (k) a second expander outlet conduit connecting said expander outlet with said conveyor conduit,
   (l) a second suction fan of substantially less capacity than said first suction fan, and connected to said delivery cyclone gas outlet,
   (m) an air compressor of substantially less capacity than said second suction fan mounted on said platform means,
   (n) a pressure line connecting the interior of said tank with said compressor,
   (o) a tank pressure valve in said pressure line for opening and closing communication between said compressor and said tank,
   (p) a delivery conduit having an inlet end connected to said pressure line between said compressor and said tank pressure valve, and an outlet adapted to be located at a discharge station substantially above said tank,
   (q) said tank outlet communicating with said delivery conduit, and
   (r) a delivery pressure valve in said delivery conduit between said pressure line and said tank outlet.

2. The invention according to claim 1 in which said tank comprises a first compartment and a second compartment, said tank outlet comprising a first outlet in said first compartment and said outlet valve comprising a first outlet valve in said first outlet, and further comprising a second outlet in said second compartment, and a second outlet valve for opening and closing said second outlet, said tank inlet comprising a main inlet pipe connected to said delivery cyclone material outlet, and first and second branch pipes leading from said main inlet pipe respectively to said first and second compartments, said tank inlet valve comprising valve means in said branch pipes for alternately opening and closing said branch pipes in order to selectively convey expanded perlite from said main inlet pipe into one of said compartments at a time, said tank pressure valve comprising first and second tank pressure valves in said pressure line for selectively opening and closing communication with said first and second compartments respectively.

3. The invention according to claim 1 in which said mobile platform means comprises a mobile tank platform supporting said tank and said air compressor, a mobile expander platform supporting said expander device and said primary cyclone, said tank inlet being located on top of said tank, a conveyor platform pivotally mounted upon said expander platform to extend over the top of said tank in operative position when said expander platform is adjacent said tank platform, said delivery cyclone being fixed to the top of said conveyor platform for coupling to said tank inlet in operative position, said conveyor platform being adapted to be pivotally swung toward said expander platform to an inoperative position when said delivery cyclone is disconnected from said tank inlet.

4. The invention according to claim 1 further comprising a classifier cyclone having an inlet, material outlet and a gas outlet, said first suction fan communicating with the inlet of said classifier cyclone, a classifier outlet conduit connecting the material outlet of said classifier cyclone with said conveyor conduit.

5. A method for delivering expanded perlite to an elevated station from a temporary perlite processing station comprising the steps of:
   (a) expanding mineral perlite ore to form expanded perlite particles at said processing station,
   (b) collecting said expanded perlite particles at a first concentration station, and separating said particles from the gases of expansion to form first-stage, concentrated expanded perlite particles,
   (c) conveying said first-stage particles to a second concentration station by means of a gaseous fluid through a conveyor conduit of predetermined diameter,
   (d) collecting and separating said first-stage particles at said second concentration station from said conveying fluid to form second-stage concentrated expanded particles,
   (e) immediately discharging said second-stage particles into a confined space,
   (f) pressurizing said space with a compressed gas,
   (g) discharging said second-stage concentrated particles from said pressurized space into a delivery conduit of smaller diameter than said conveyor conduit, and
   (h) forcing compressed air through said delivery conduit at a smaller capacity rate than the gaseous fluid passing through said conveyor conduit, to deliver the concentrated perlite particles discharged from said confined space directly to an elevated station under pressure and with a minimum of damage to said particles.

References Cited

UNITED STATES PATENTS

| | | | |
|---|---|---|---|
| 1,038,781 | 9/1912 | Myles | 302—55 X |
| 1,718,507 | 6/1929 | Wenzel. | |
| 1,935,843 | 11/1933 | Goebels | 302—53 X |
| 2,594,072 | 4/1952 | Ridley | 302—53 X |
| 2,602,782 | 7/1952 | Zoradi | 263—21 X |
| 2,621,034 | 12/1952 | Stecker | 263—21 |
| 2,807,453 | 9/1957 | Pierce | 263—21 |
| 3,152,842 | 10/1964 | Anderson | 302—53 |
| 3,206,905 | 9/1965 | Wavering | 263—21 X |
| 3,311,358 | 3/1967 | Wagner | 263—21 |

FOREIGN PATENTS

| | | |
|---|---|---|
| 673,484 | 6/1952 | Great Britain. |

FRANK W. LUTTER, *Primary Examiner.*

U.S. Cl. X.R.

209—10, 11, 144; 302—53